Figure 1:
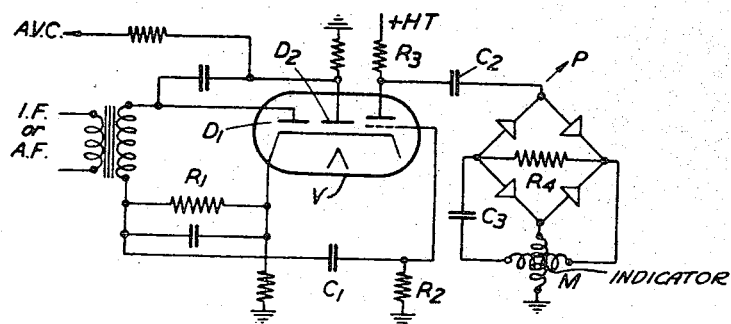

July 29, 1947.  C. W. EARP  2,424,560

VISUAL COURSE INDICATOR FOR RADIO DIRECTIVE SYSTEMS

Filed Nov. 23, 1942

Inventor
C. W. Earp.
By Loyd Hall Sutton
Attorney

Patented July 29, 1947

2,424,560

UNITED STATES PATENT OFFICE 2,424,560

VISUAL COURSE INDICATOR FOR RADIO DIRECTIVE SYSTEMS

Charles William Earp, London W. C. 2, England, assignor to Standard Telephones and Cables Limited, London, England, a British company Application November 23, 1942, Serial No. 466,656
In Great Britain December 26, 1941

5 Claims. (Cl. 177—352)

The present invention relates to a visual course indicating arrangement in a radio-directive system of the kind in which complementary dot and dash (for example A—N or E—T) signals are transmitted to the right and left respectively of a course line so as to produce in a receiver on said line a continuous dash and said indicating arrangement being of the kind in which the variable component of the rectified received signal wave is applied to one winding of a dynamometer type indicating instrument to the other winding of which is applied the original signals or a wave derived therefrom. Such a visual course indicating arrangement is described and claimed in British patent specification No. 526,114. In the specific embodiment described in said British specification No. 526,114 the derived signal consisted of two short pulses which occurred at the beginning and end of a dot or dash signal. It will be observed that this derived signal has a component frequency equal to the frequency of the received signal, but is only effective in operating the indicating instrument during a fraction only of the dot or dash signal period.

The object of the present invention is to provide more efficient arrangements by rendering the derived wave effective in operating the indicating instrument during substantially the whole of the dot or dash signal period.

According to one aspect of the invention in or for a radio directive system wherein complementary dot and dash signals are transmitted to the right and left respectively of a course line so as to produce in a receiver on said line a continuous dash, a visual course indicating arrangement of the kind in which the variable component of the rectified received signal wave is applied to one winding of a dynamometer type indicating instrument to the other winding of which is applied the original signals or a wave derived therefrom, is characterized in this that the variable component of the rectified received signal wave is applied to one winding of the dynamometer instrument and also directly to a full-wave rectifying arrangement the variable component in the rectified output of which is applied to the other winding of the dynamometer indicating instrument.

According to another aspect of the invention a visual course indicating arrangement for a radio directive system of the kind in which complementary dot-dash signals are transmitted to the right and left respectively of a course line so as to produce in a receiver on said line a continuous dash comprises a rectifier to which the received signal is applied, means for removing the direct current component from the output of the said rectifier, means for obtaining from the variable portion of said rectifier signal a continuous wave of constant shape and phase irrespective of whether the dot or dash signal is being received, and a dynamometer type indicating instrument to one winding of which the variable component of the rectified signal is applied and to the other winding of which the said continuous wave is applied.

Figure 2:
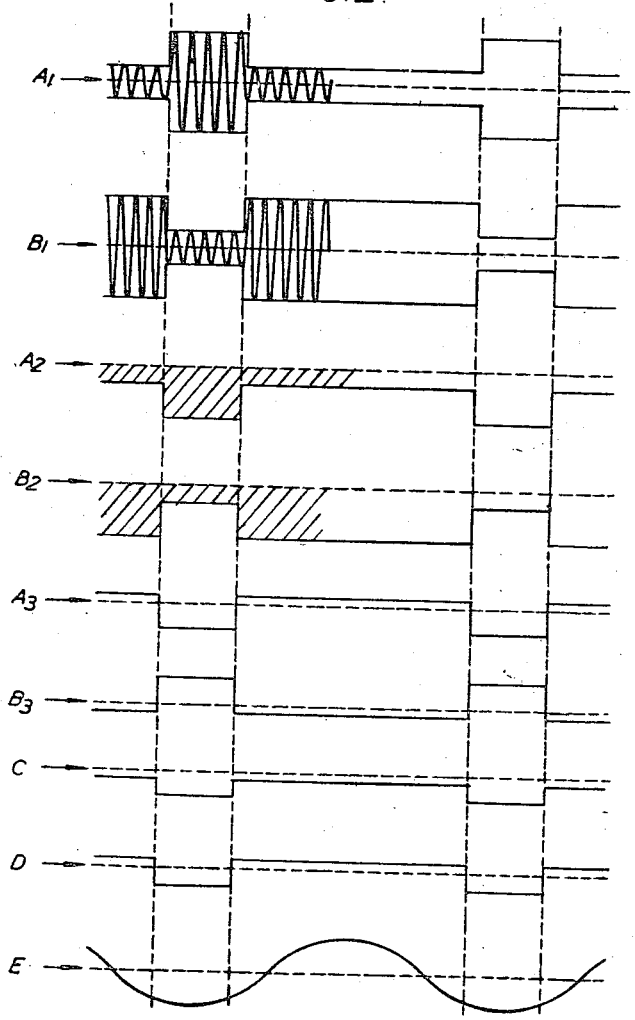

In the accompanying drawings one suitable circuit arrangement for carrying out the invention is shown in Fig. 1. Fig. 2 shows wave-forms as they appear at various stages of the apparatus.

A receiver which is tuned to the commutated transmission receives a signal which bears an envelope of the "dot" wave-form (Fig. 2—A1) or "dash" wave-form (Fig. 2—B1). These wave-forms, which may be at audio frequency, or at signal or intermediate frequency, are applied to the diode D1 (Fig. 1) and rectified. The resultant wave-form appearing across R1 is A2 (from A1) or B2 (from B1).

(The signal may be rectified by diode D2, the output being used for automatic gain control AVC according to usual practice).

The waves A2 or B2 are transmitted to R2 after removal of the D. C. component by means of C1, which is large enough to pass the fundamental keying frequency. The resultants are as shown at A3 and B3. The triode portion of the valve V is used to amplify A3 or B3, and the amplified waves appear between point P and ground. Capacity C2 which is also large enough to pass the fundamental keying frequency, is inserted between the anode and point P. The signal is actually impressed upon a bridge-type rectifier unit, and one winding of a dynamometer course indicator M, in series. This course indicator winding, therefore, has impressed upon it the wave-shape A3 or B3.

The bridge rectifier rectifies A3 or B3 to produce the wave C (Fig. 2) in R4. It is important to note here that this process of rectification produces the same wave-form from A3 or B3. Condenser C3 now removes the D. C. component to produce the wave-form D (Fig. 2), which is applied to the second winding of the indicator.

If, now, the receiver is receiving "dot" signals according to wave-form A1 (Fig. 2) the meter is fed by waves A3 and D. The meter torque, which is proportional to the product of the currents in the windings, is therefore always positive, and a "positive" deflection results.

If, however, the receiver is in the "dash" zone, receiving the wave B1, then the meter is fed by B3 and D, which are always of opposite sign or phase, and the resultant deflection is negative. A refinement of this system of indication which is not shown in the schematic of Fig. 1 would be to subject the waves A3/B3 or D to a sharp filter which selects the fundamental dot frequency only. For example, the sine-wave E would be selected from D. Such selection makes the meter response depend upon the frequency of the keying, whereby the effect of interference and excessive noise is minimised.

What is claimed is:

1. A visual course indicating arrangement in a radio directive system of the kind in which complementary dot-dash signals of substantially rectangular wave form having one sign for dot signals and the opposite sign for dash signals are transmitted to the right and left respectively of a course line so as to produce in a receiver on said line a continuous dash, comprising a rectifier to which the received signal is applied, means for removing the direct current component from the output of said rectifier, means for obtaining from the variable portion of the output of said rectifier a continuous wave of constant shape and phase irrespective of whether the dot or dash signal is being received, and a dynamometer type indicating instrument to one winding of which the variable rectified original signal component is applied and to the other winding of which the said continuous wave of constant shape is applied.

2. A visual course indicating arrangement in a radio directive system of the kind in which complementary dot-dash signals are transmitted to the right and left respectively of a course line so as to produce in a receiver on said line a continuous dash, comprising a rectifying device to which the received signals are applied, means for obtaining from the output of said rectifying device substantially rectangular pulses having a wave form similar to that of the received dot and dash signals but of one sign when the dot signals are received and of opposite sign when the dash signals are received, means for obtaining from the output of said rectifying device other pulses of constant shape and sign irrespective of whether dot or dash signals are being received, a dynamometer type indicating instrument having two windings, and means for applying to said two windings respectively said rectangular pulses and said other pulses of constant shape and sign.

3. A visual course indicating arrangement in a radio directive system of the kind in which complementary dot-dash signals are transmitted to the right and left respectively of a course line so as to produce in a receiver on said line a continuous dash, comprising a rectifying device to which the received signals are applied, an output circuit for said rectifying device including a condenser for removing the direct current component and a resistance, an amplifying valve including a cathode, a control grid and an anode, means for applying a potential developed across said resistance to said control grid, including a condenser for removing the direct current component therefrom, means for obtaining from the output circuit of said valve substantially rectangular pulses having a wave form similar to that of the received dot and dash signals but having one sign when dot signals are received and of opposite sign when dash signals are received, means for obtaining from the output of said rectifying device other pulses of constant shape and sign irrespective of whether dot or dash signals are being received, a dynamometer type indicating instrument having two windings, and means for applying to said two windings respectively said rectangular pulses and said other pulses of constant shape and sign.

4. A visual course indicator according to claim 2, wherein said means for obtaining said pulses from the output of said rectifying device comprises a rectifier bridge to one diagonal of which the output of said rectifying device is applied in series with one winding of said dynamometer type instrument, a resistance connected across the other diagonal of said bridge and means for applying a voltage developed across two points on said resistance to the other winding of said instrument.

5. A visual course indicator according to claim 2, further comprising a second rectifying device, means for applying to the input thereof a portion of the received signals, and means for deriving from the output thereof a voltage for automatic gain control.

CHARLES WILLIAM EARP.

REFERENCES CITED

The following references are of record in the file of this patent:

UNITED STATES PATENTS

| Number | Name | Date |
|---|---|---|
| 2,271,534 | Bailey | Feb. 3, 1942 |